Nov. 30, 1943. P. DE F. C. PYCROFT 2,335,392
ELECTRICAL TESTING APPLIANCE
Filed Jan. 23, 1942 3 Sheets-Sheet 1

Inventor
Paul DeFerranti Craddock Pycroft
By Glascock Downing Seebre
Attys.

Nov. 30, 1943. P. DE F. C. PYCROFT 2,335,392
ELECTRICAL TESTING APPLIANCE
Filed Jan. 23, 1942 3 Sheets-Sheet 2

Inventor
Paul DeFerranti Craddock Pycroft

Nov. 30, 1943.   P. DE F. C. PYCROFT   2,335,392
ELECTRICAL TESTING APPLIANCE
Filed Jan. 23, 1942   3 Sheets-Sheet 3
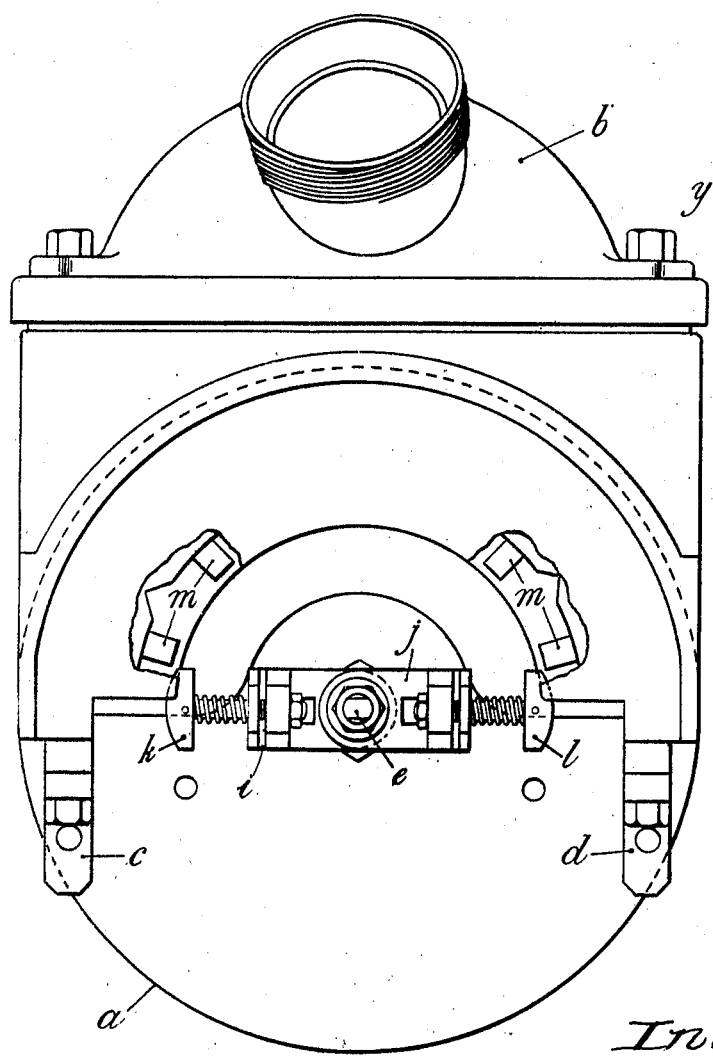
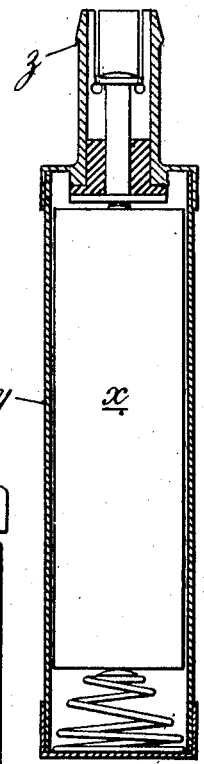
Inventor
Paul DeFerranti Craddock Pycroft
By Glascock Downing + Seebold
Attys Patented Nov. 30, 1943

2,335,392

UNITED STATES PATENT OFFICE 2,335,392

ELECTRICAL TESTING APPLIANCE

Paul de Ferranti Craddock Pycroft, Ruislip, England

Application January 23, 1942, Serial No. 427,992 In Great Britain January 28, 1941

6 Claims. (Cl. 175—183)

This invention relates to electrical testing appliances, more particularly to the testing of magneto leads for aeroplane and other engines with which it will be mainly described. Taking the case of a modern aeroplane engine having say twelve cylinders in V formation, it is not an easy matter in practice to test the continuity of the leads between the magnetos and sparking plugs, because the wiring arrangement is somewhat complex.

There are usually two magnetos to be considered, and two sets of sparking plugs, as well as the fact that the firing order, and therefore the order of connections on the magneto, is not the same as the numerical order of the cylinders.

It usually requires two testers to carry out the test. This is done by means of what is in effect a lead electrically in parallel with the lead to be tested, there being in this test lead a battery and a lamp. If the lead to be tested is continuous, that is to say, if there be no break in it, the examination of which is a point of the test, on the test lead being applied to the appropriate contact on the distributor and the corresponding sparking plug terminal, the lamp becomes illuminated, but if not, it fails to glow. Failure to glow, however, may be due to a poor contact made by faulty pressing on the distributor contact segment, or on the sparking plug terminal, or due to a faulty contact at the distributor or sparking plug terminal ends of the lead under test or a combination of some of these. There is no certainty of this contacting with the distributor segment, and to make sure, some little time is taken which becomes amplified when testing the whole set of leads, and more so when testing a number of engines.

The principal object of the present invention is to provide an apparatus which will facilitate this testing.

The invention consists in a portable apparatus for testing in desired succession high tension ignition leads connected to a distributor including an indicator plate, means thereon for temporarily locating same in relation to said distributor, bearings on said plate, a hand-operable spindle mounted in said bearings, at least one contact arm on said spindle, means on said plate and further means on said spindle for indicating the prevailing position of said arm in relation to said plate and means for indicating in desired succession the condition of the individual high tension ignition leads.

The invention also consists in testing apparatus as set forth in the preceding paragraph applied to the testing of screened H. T. ignition leads.

The invention also consists in a testing apparatus for high tension ignition leads as set forth in either of the two preceding paragraphs, wherein said source of current comprises a high voltage generator.

The invention also consists in a testing apparatus for high tension ignition leads as set forth in any of the three preceding paragraphs, wherein two contact arms are provided operating in parallel planes.

The invention also consists in a testing apparatus for high tension ignition leads as set forth in the first or second of the four preceding paragraphs, wherein said source of current comprises a low voltage battery contained in a metal casing for attachment to the ends of the high tension leads adjacent to the sparking plugs.

The invention also consists in a testing apparatus for high tension ignition leads as set forth in any of the five preceding paragraphs, wherein said contact arm is mounted on a spindle having a knob and pointer, said spindle being mounted in a plate furnished with adjustable brackets.

The invention also consists in a testing apparatus for high tension leads of ignition systems substantially as hereinafter described with reference to the accompanying drawings.

Referring to the accompanying diagrammatic drawings—

Figure 3 is a rear view of the appliance of Figure 2 as connected to a typical distributor cover.

Figure 6 is a sectional elevation of a cartridge member embodying an alternative source of electricity.

Figure 5:
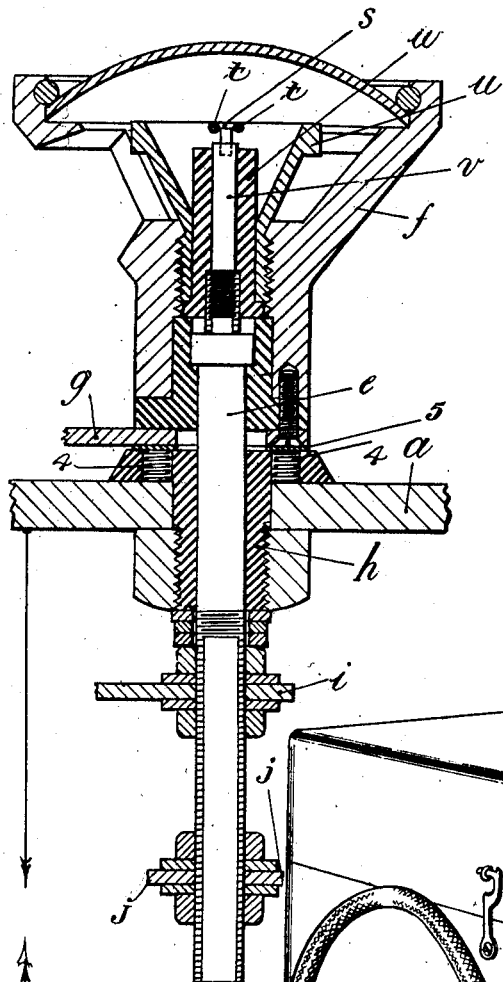
Figure 5 is an enlarged sectional elevation of part of the appliance of Figures 2, 3 and 4.
Figure 1:
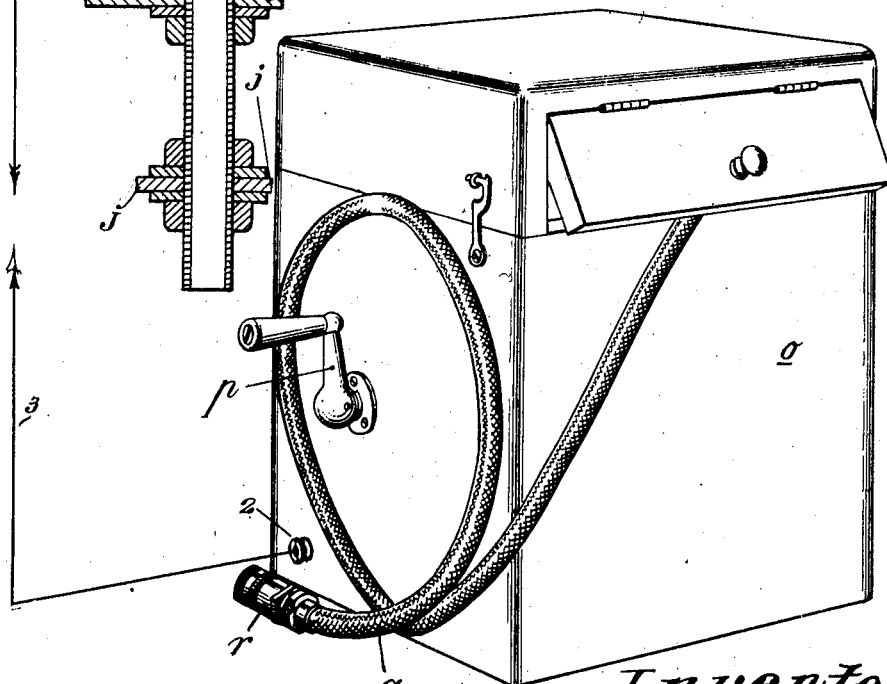
Figure 1 is a perspective view of a container for a testing outfit of one form embodying the present invention.
Figure 2:
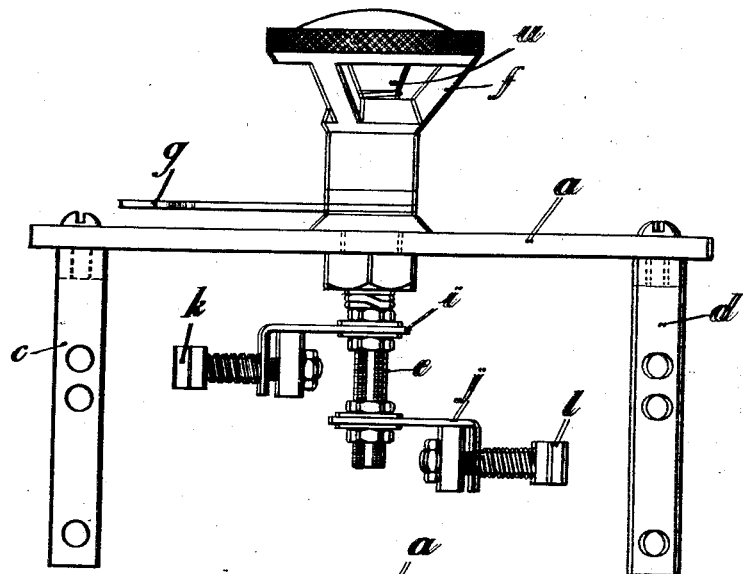
Figure 2 is a side elevation of part of the outfit of Figure 1.
Figure 4:
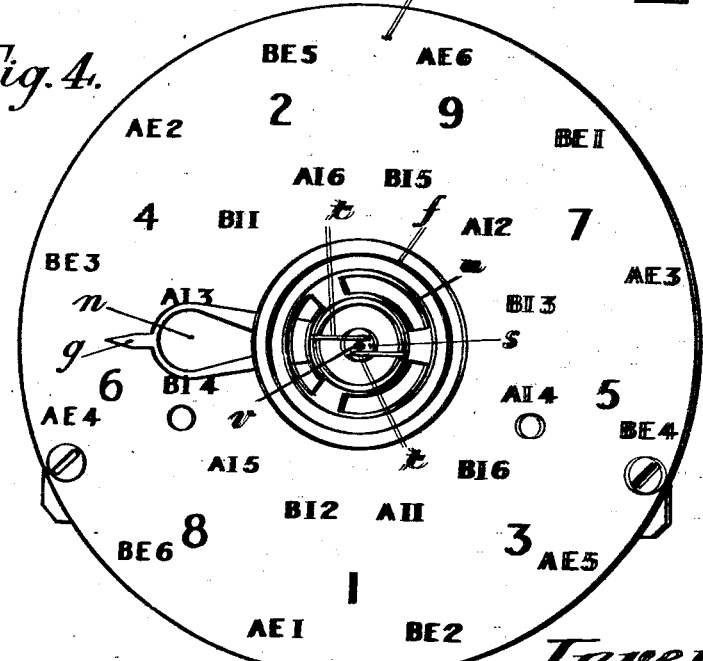
Figure 4 is a front view of the appliance of Figures 2 and 3.

In carrying the invention into effect in one form illustrated by way of example in Figures 1–5 as applied to testing apparatus for screened H. T. ignition leads, I provide a brass or like plate a, which can be applied to the holes normally used for attaching a distributor cover b to a magneto (not shown) in that two drilled location brackets cd of suitable length are attached to this plate. Through the centre of the plate a spindle *e* projects on both sides. Above the plate it carries a metal selector knob *f* and a selector indicator.

The spindle is rigid with a pointer arm *g* and is mounted in a bush of insulating material *h*. Holes in the flange of the bush *h* house springs 4, 4 in contact with the plate *a* and with a brass washer 5 whereby the nut *f* is maintained electrically connected to the plate *a*. The spindle has mounted on it, below the plate, a pair of brackets *ij* each carrying a spring urged contact plunger *kl*.

The contacts *kl* are adapted to contact with two sets of six fixed contact inserts *m* which are connected in the usual manner with the ends of the respective high tension leads (not shown); the two sets of inserts *m* are disposed in separate planes and each set co-operates with one only of the contacts *kl*. The leads are encased in a flexible earthed covering having internally screwed sockets at the ends adjacent to the sparking plugs, for contacting with the distributor segments.

The instrument plate *a* in case of, say, application of the instrument to the testing of a twelve cylinder V engine, is engraved with two series of numbers, the outer series A.E.1. to A.E.6. and B.E.1. to B.E.6. corresponding to the twelve plugs associated with one magneto, and the other series A.1.1. to A.1.6. and B.1.1. to B.1.6. corresponding to the twelve plugs associated with the other magneto. These will normally require to be arranged counter-clockwise for one set and clockwise for the other. Incidentally, this reverse arrangement is liable to lead to confusion with the old method of testing, which is easily overcome by means of an apparatus as described.

The tip of the pointer *g* is used in connection with the outer ring of numbers, whilst a window *n* co-operates with the inner ring of numbers.

The containing box *o* embodies a high voltage A. C. generator operable through gearing by a handle *p* and an insulated lead from the generator encased by a flexible metal shield *p* having a screwed plug *r* is provided. The other lead from the generator is connected to a terminal 2 from which a connection is made to the plate *a* by a lead 3. The knob *f* embodies a spark gap *s* comprising two wires *t* connected to a metal socket member *u* and disposed adjacent to a screwed pin *v* surrounded by an insulating bush *w* and attached to the end of the spindle *e*.

In use, the plug *r* is screwed to the socket of an H. T. lead after the latter has been disconnected from its sparking plug, and the selector knob *f* is turned into the appropriate position to test the particular lead, which can very quickly be done. Upon turning the handle *p* a spark occurs at the spark gap *s* indicating that the lead is intact and its insulation resistance sufficient. All the other H. T. leads are then similarly tested in turn.

The contact for each test is substantially constant, that is to say, there is not a poor contact in connection with one lead and a good contact in connection with the other, and if there is any doubt of the contact being made between the magneto leads and their appropriate terminals, these can readily be shaken or pulled to ensure that these are in order.

In a modified arrangement instead of employing the H. T. generator and spark gap *s* I employ a dry battery *x* in a metal case *y* the end *z* of which is adapted to be pushed into the ends of the respectively H. T. leads in turn. With this arrangement the spark-gap-socket member *u* is replaced by an electric flash lamp bulb to give visible indication of the continuity of the H. T. leads.

Apparatus in accordance with the present invention may be employed for measuring the insulation resistance of the insulation of H. T. ignition leads by employing for example the arrangement of Figures 1 to 5 but substituting a Megger instrument for the high voltage A. C. generator. The metal socket member *u* though not required may be left in place if desired.

I claim:

1. Portable apparatus for testing in desired succession high tension ignition leads connected to a distributor including an indicator plate, means thereon for temporarily locating same in relation to said distributor, bearings on said plate, a hand-operable spindle mounted in said bearings, at least one contact arm on said spindle, means on said plate and further means on said spindle for indicating the prevailing position of said arm in relation to said plate and means for indicating in desired succession the condition of the individual high tension ignition leads.

2. Testing apparatus as claimed in claim 1 applied to the testing of screened high tension ignition leads.

3. Testing apparatus for high tension ignition leads as claimed in claim 1 including a source of current comprising a high voltage generator.

4. Testing apparatus for high tension ignition leads as claimed in claim 1, wherein two contact arms are provided operating in parallel planes.

5. Testing apparatus for high tension ignition leads as claimed in claim 1 including a source of current comprising a low voltage battery contained in a metal casing for attachment to the ends of the high tension leads adjacent to the sparking plugs.

6. Testing apparatus for high tension ignition leads as claimed in claim 1, wherein said contact arm is mounted on a spindle having a knob and pointer, said spindle being mounted in a plate furnished with adjustable brackets.

PAUL DE FERRANTI
CRADDOCK PYCROFT.